US012643365B2

(12) United States Patent
Lee et al.

(10) Patent No.:  US 12,643,365 B2
(45) Date of Patent:       Jun. 2, 2026

(54) SHOCK ABSORBER

(71) Applicant: HL MANDO CORPORATION, Pyeongtaek-si (KR)

(72) Inventors: Seungjoon Lee, Seoul (KR); Kwangduk Baek, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 324 days.

(21) Appl. No.: 18/272,960

(22) PCT Filed: Mar. 30, 2023

(86) PCT No.: PCT/KR2023/004253
§ 371 (c)(1),
(2) Date: Jul. 18, 2023

(87) PCT Pub. No.: WO2024/172203
PCT Pub. Date: Aug. 22, 2024

(65) Prior Publication Data
US 2025/0010682 A1      Jan. 9, 2025

(30) Foreign Application Priority Data

Feb. 17, 2023    (KR) ........................ 10-2023-0021433

(51) Int. Cl.
B60G 17/08          (2006.01)
B60G 13/08          (2006.01)

(52) U.S. Cl.
CPC ............. B60G 17/08 (2013.01); B60G 13/08 (2013.01); B60G 2202/24 (2013.01);
(Continued)

(58) Field of Classification Search
CPC .... B60G 17/08; B60G 13/08; B60G 2202/24; B60G 2204/62; B60G 2206/41;
(Continued)

(56) References Cited

U.S. PATENT DOCUMENTS 9,605,726 B2 *  3/2017  Baldoni ................... F16F 9/49
10,752,076 B2    8/2020  Knapczyk et al.
(Continued)

FOREIGN PATENT DOCUMENTS

CN          215171777 U      12/2021
DE          19934878 A1 *  2/2000    ............ F16F 9/3207
(Continued)

OTHER PUBLICATIONS

Office Action dated Oct. 31, 2024 for corresponding Korean Patent Application No. 10-2023-0021433, along with an English machine translation (14 pages).

(Continued)

*Primary Examiner* — Christopher P Schwartz
(74) *Attorney, Agent, or Firm* — Hauptman Ham, LLP

(57) ABSTRACT
Disclosed herein is a shock absorber. The shock absorber is provided to include a damping tube provided in a compression chamber and formed in a hollow shape to have a damping chamber therein, a damping piston provided to slidably move along an inner side of the damping tube and configured to pressurize a working fluid accommodated in the damping chamber, an extension rod configured to connect the damping piston and a piston rod, and at least one damping hole formed through the damping tube to allow the damping chamber and the compression chamber to communicate with each other.

19 Claims, 9 Drawing Sheets

(52) U.S. Cl.
CPC ...... *B60G 2204/62* (2013.01); *B60G 2206/41* (2013.01); *B60G 2500/104* (2013.01); *B60G 2600/21* (2013.01); *B60G 2800/162* (2013.01); *B60G 2800/916* (2013.01)

(58) Field of Classification Search
CPC .......... B60G 2500/104; B60G 2600/21; B60G 2800/162; B60G 2800/916
USPC ........... 188/284–287, 313, 315, 318, 322.15, 188/322.2, 322.22
See application file for complete search history.

(56) References Cited

U.S. PATENT DOCUMENTS

| | | | | |
|---|---|---|---|---|
| 10,876,591 | B2 | 12/2020 | Mallin et al. | |
| 11,067,147 | B2 | 7/2021 | Bruno et al. | |
| 11,181,161 | B2 * | 11/2021 | Baldoni | .................... F16F 9/19 |
| 11,280,380 | B2 | 3/2022 | Knapczyk, II | |
| 12,372,133 | B2 * | 7/2025 | Sankaran | ................... F16F 9/22 |
| 2016/0223045 | A1 | 8/2016 | Baldoni et al. | |
| 2021/0088096 | A1 | 3/2021 | Baldoni et al. | |
| 2021/0131519 | A1 | 5/2021 | Mallin | |
| 2021/0404528 | A1 | 12/2021 | Kasprzyk et al. | |

FOREIGN PATENT DOCUMENTS

| | | |
|---|---|---|
| DE | 112016000579 T5 | 12/2017 |
| DE | 10 2019 206 510 A1 | 11/2020 |
| JP | H8-219322 A | 8/1996 |
| JP | H10-299817 A | 11/1998 |
| KR | 20-1998-0038229 U | 9/1998 |
| KR | 10-2482244 B1 | 12/2022 |

OTHER PUBLICATIONS

International Search Report issued Nov. 13, 2023, corresponding to International Patent Application No. PCT/KR2023/004253, with English translation (6 pages).
Office Action dated Jan. 15, 2026, for the corresponding German Patent Application No. 11 2023 000 491.9, along with an English Translation (18 pages).

* cited by examiner

SHOCK ABSORBER

CROSS REFERENCE TO RELATED APPLICATION

The present application is a national stage filing under 35 U.S.C § 371 of PCT application number PCT/KR2023/004253 filed on Mar. 30, 2023, which is based upon and claims the benefit of priority to Korean Patent Application No. 10-2023-0021433, filed on Feb. 17, 2023, in the Korean Intellectual Property Office. All of the aforementioned applications are incorporated herein by reference in their entireties.

TECHNICAL FIELD

Embodiments of the present disclosure relate to a shock absorber, and more particularly, to a shock absorber capable of improving ride comfort for occupants and steering stability of a vehicle body by stably mitigating an impact transmitted during a compression stroke.

BACKGROUND ART

In general, a vehicle is equipped with a suspension system to protect a vehicle body and occupants from a physical impact applied to the vehicle body from a road surface while traveling. As essential devices of the suspension system, there are a spring, a stabilizer, and a shock absorber, and among them, the shock absorber plays a pivotal role in reducing fatigue applied to the spring by absorbing impacts and vibrations generated during compression and expansion of the spring and in improving ride comfort and steering stability by damping the impacts and vibrations transmitted from the road surface to occupants and cargo.

In general, the shock absorber includes a main body, a piston valve, and a piston rod, where the main body has a hollow cylindrical shape and is connected to an axle, and the piston valve and the piston rod are connected to a vehicle body and transmit kinetic energy in a vertical direction toward the main body.

Depending on the structure of the main body, the shock absorber is divided into a mono-tube shock absorber provided as a single-layer structure of a single tube and a double-tube shock absorber provided as a double structure of an inner tube and an outer tube. In addition, depending on the type of filler, the shock absorber is divided into a hydraulic shock absorber filled with oil and a gas-type shock absorber filled with nitrogen gas or the like, and in recent years, in order to meet the trend of luxury vehicles and various tastes of consumers, a variable shock absorber and an electronic controlled suspension (ECS) that are capable of adjusting a damping force according to an operating environment of the vehicle or a choice of a driver have been applied.

The above-mentioned shock absorber is operated by the vibration of the vehicle body according to a road surface condition, and the damping force is changed according to an operating speed of the shock absorber. When the damping force of the shock absorber is set low, the vibrations and impacts generated by irregularities of the road surface while the vehicle is traveling may be smoothly absorbed, improving the ride comfort of the vehicle, whereas a behavior of the vehicle body may become dull, degrading the steering stability of the vehicle body. Conversely, when the damping force of the shock absorber is set high, changes in the attitude of the vehicle body may be suppressed, improving the steering stability, whereas vibrations and impacts generated by the irregularities of the road surface may be transmitted to the vehicle body, reducing the ride comfort. As such, since the damping force characteristics of the shock absorber have a great influence on the ride comfort and steering stability of the vehicle, it is very important to how to adjust and set the damping force characteristics of the shock absorber.

Technical Problem

The present embodiment is directed to providing a shock absorber capable of promoting ride comfort and steering stability of a vehicle.

The present embodiment is directed to providing a shock absorber capable of preventing an impact from being applied to a vehicle body by adding an additional damping force in addition to a damping force produced by a piston valve.

The present embodiment is directed to providing a shock absorber capable of preventing an impact from being applied to a vehicle body by adding an additional damping force when a compression stroke exceeds a certain stroke range.

The present embodiment is directed to providing a shock absorber capable of gradually adding a damping force in a compression stroke.

The present embodiment is directed to providing a shock absorber capable of generating a stable damping force even for a heavy vehicle body.

The present embodiment is directed to providing a shock absorber capable of suppressing an increase in a length and weight of a device while dealing with a wide stroke range in a compression stroke.

TECHNICAL SOLUTION

In accordance with one aspect of the present disclosure, a shock absorber including an inner tube having a cylinder filled with a working fluid therein, a piston rod extending in a vertical direction and connected to a vehicle body, and a piston valve coupled to an end of the piston rod to partition the cylinder into a rebound chamber and a compression chamber includes a damping tube provided in the compression chamber and formed in a hollow shape to have a damping chamber therein, a damping piston provided to slidably move along an inner side of the damping tube and configured to pressurize the working fluid accommodated in the damping chamber, an extension rod configured to connect the damping piston and the piston rod, and at least one damping hole formed through the damping tube to allow the damping chamber and the compression chamber to communicate with each other.

The damping tube may extend in the vertical direction, and a plurality of damping holes may be arranged in the damping tube in the vertical direction.

The plurality of damping holes may be formed through the damping tube in a direction parallel to a radial direction of the damping tube, and may be provided so that a diameter or size thereof gradually decreases from an upper side toward a lower side.

The shock absorber may further include a rod joint configured to couple the piston rod and the extension rod, wherein the coupling is performed so that a disposition angle of the extension rod with respect to the piston rod is freely adjustable.

The rod joint may include a rod nut including a first hole into which at least a part of a lower end of the piston rod is inserted and a second hole into which at least a part of an upper end of the extension rod is accommodated, a groove formed to be recessed along a circumferential direction on an outer circumferential surface of the upper end of the extension rod, a guide member having an outer circumferential surface facing an inner circumferential surface of the second hole and an inner circumferential side portion inserted into the groove, and having an opening formed on one side, and a leaf spring configured to elastically support the guide member.

The rod joint may further include a guide cap coupled to a lower end of the second hole to support the guide member and the leaf spring, and the leaf spring may have an upper end in contact with the guide member and a lower end supported by the guide cap.

The rod joint may further include a rod washer provided on at least one of an upper surface and a lower surface of the guide member.

The damping piston may include a piston member having an outer circumferential surface in close contact with an inner circumferential surface of the damping tube, a connection passage formed through the piston member in a vertical direction, at least one disk member provided on an upper end of the piston member to open and close the connection passage, and a retainer configured to support the disk member on the piston member.

The damping piston may further include a disk washer provided on an upper surface of the disk member to limit a degree of opening of the connection passage by the disk member.

The damping piston may further include a rod pin passing through the piston member and inserted into and coupled to a lower end of the extension rod to bind the piston member and the extension rod.

The shock absorber may further include an outer tube disposed to be spaced apart from an outer side of the inner tube and a reservoir chamber formed between the outer side of the inner tube and an inner side of the outer tube.

The shock absorber may further include a body valve coupled to a lower side of the inner tube and configured to control the flow of the working fluid between the damping chamber and the reservoir chamber.

The shock absorber may further include a tube joint configured to couple the damping tube and the body valve.

The tube joint may include a housing provided to have an open top to allow at least a part of a lower end of the damping tube to enter the inside of the housing, at least one passage hole formed through a bottom surface of the housing in the vertical direction to allow the damping chamber and the compression chamber to communicate with each other, a suction disk provided on an upper surface of the bottom surface to open and close the passage hole, and a suction spring configured to elastically support the suction disk.

The tube joint may further include a body pin having an upper portion exposed to the damping chamber through the body valve, the housing, and the suction disk, a tube nut coupled to an upper end of the body pin, and a suction guide interposed between a lower surface of the tube nut and an upper surface of the housing and configured to support an upper end of the suction spring.

The tube joint may further include a housing cap interposed between the housing and the damping tube.

An inner diameter of the housing may be provided to be larger than an outer diameter of the damping tube so that a mounting space is formed between an inner circumferential surface of the housing and an outer circumferential surface of the damping tube, and the housing cap may include an insertion portion inserted into the mounting space and press-fitted to the inner circumferential surface of the housing.

A flange formed to extend outwardly to contact a lower end of the insertion portion may be provided at the lower end of the damping tube.

An inner diameter of the housing may be provided to be larger than an outer diameter of the damping tube so that a mounting space is formed between an inner circumferential surface of the housing and an outer circumferential surface of the damping tube, and the housing cap may include an insertion portion inserted into the mounting space to contact the flange, and a fastening member configured to bind the insertion portion and the housing.

The rod joint may include a rod nut including a first hole into which at least a part of a lower end of the piston rod is inserted and a second hole into which at least a part of an upper end of the extension rod is accommodated, and a ball member formed at the upper end of the extension rod and inserted into the second hole to be freely rotatable.

The rod joint may further include a guide cap coupled to a lower end of the second hole to prevent separation of the ball member.

In accordance with another aspect of the present disclosure, a shock absorber including an inner tube having a cylinder filled with a working fluid therein, a piston rod extending in a vertical direction and connected to a vehicle body, and a piston valve coupled to an end of the piston rod to partition the cylinder into a rebound chamber and a compression chamber includes a damping tube provided in the compression chamber and formed in a hollow shape to have a damping chamber therein, a damping piston configured to generate an additional damping force by pressurizing the working fluid accommodated in the damping chamber, an extension rod configured to bind the damping piston and the piston rod and provided so that a disposition angle of the extension rod with respect to the piston rod is freely adjustable, and at least one damping hole formed through the damping tube to allow the damping chamber and the compression chamber to communicate with each other.

A plurality of damping holes may be arranged in the damping tube in the vertical direction, and the plurality of damping holes may be provided so that a diameter or size thereof gradually decreases toward a pressurizing direction of the damping piston.

Advantageous Effects

A shock absorber in accordance with one embodiment of the present disclosure, it is possible to promote ride comfort and steering stability of a vehicle.

A shock absorber in accordance with one embodiment of the present disclosure, it is possible to prevent shock from being applied to a vehicle body by providing an additional damping force in addition to a damping force produced by a piston valve.

A shock absorber in accordance with one embodiment of the present disclosure, it is possible to prevent an impact from being applied to a vehicle body by providing an additional damping force when a compression stroke exceeds a certain stroke range.

A shock absorber in accordance with one embodiment of the present disclosure, it is possible to gradually provide a damping force in a compression stroke.

A shock absorber in accordance with one embodiment of the present disclosure, it is possible to provide a stable damping force even for a heavy vehicle body.

A shock absorber in accordance with one embodiment of the present disclosure, it is possible to suppress an increase in a length and weight of a device while dealing with a wide stroke range in a compression stroke.

MODES OF THE INVENTION

Hereinafter, embodiments of the present disclosure will be described in detail with reference to the accompanying drawings. The following embodiments are provided to completely convey the spirit of the present disclosure to those skilled in the art to which the present disclosure pertains. The present disclosure is not limited to the embodiments shown herein and may be embodied in other forms. The drawings are not intended to limit the scope of the present disclosure in any way, and the size of components may be exaggerated for clarity of illustration.

Figure 1:
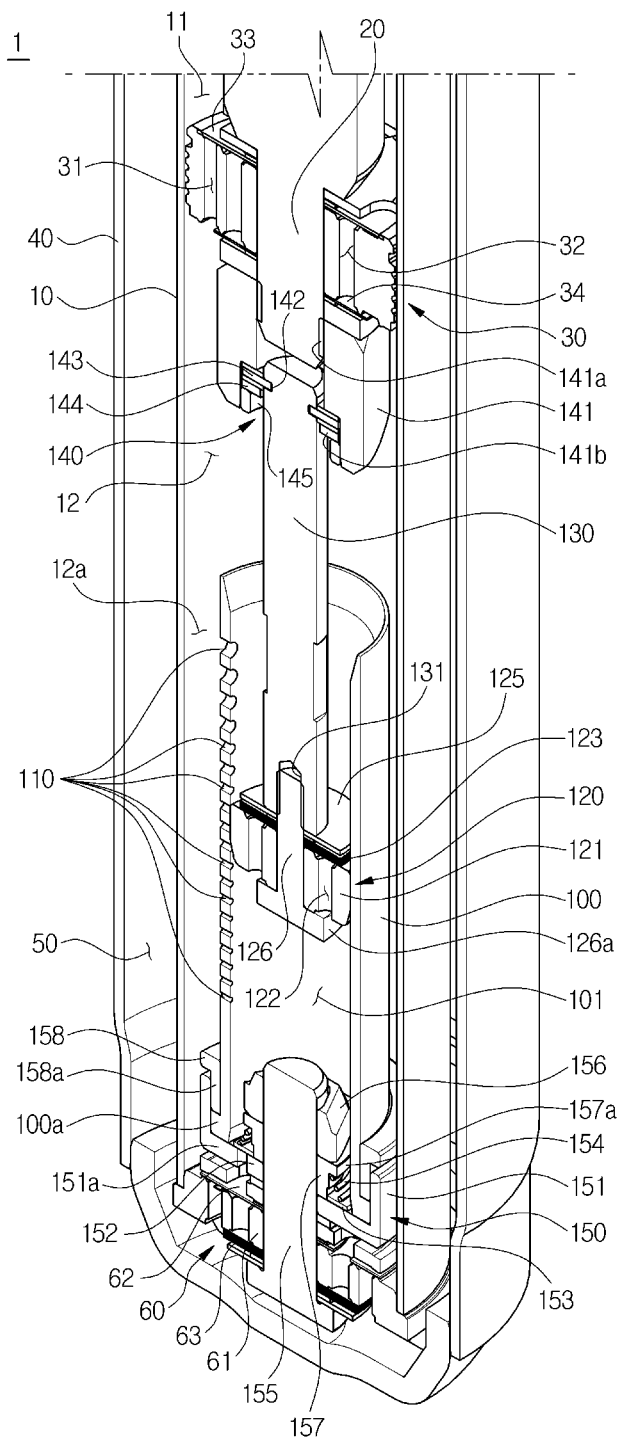
FIG. 1 is a cutaway perspective view showing a shock absorber in accordance with a first embodiment of the present disclosure.
Figure 2:
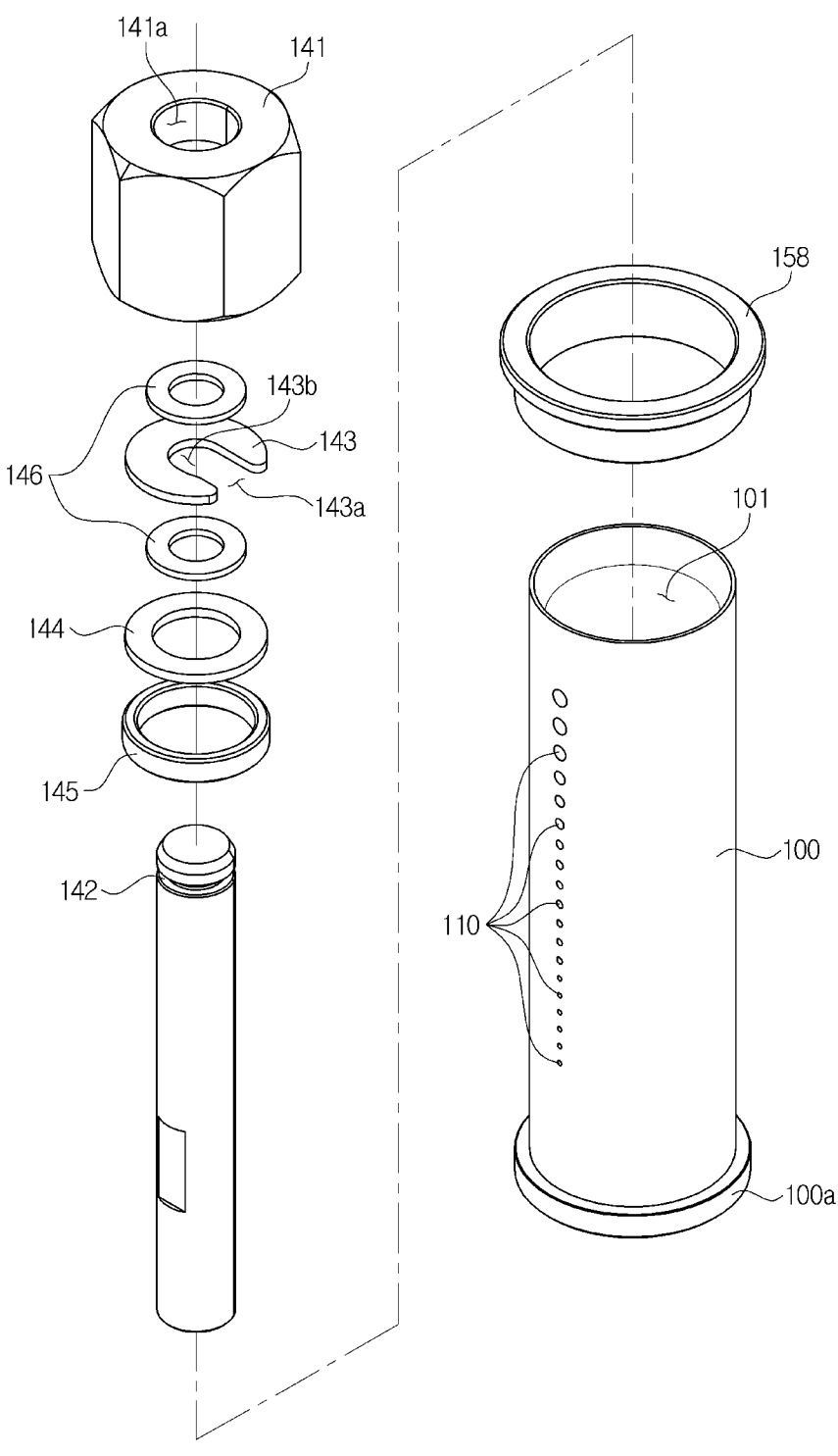
FIG. 2 is an exploded perspective view showing a damping tube, a damping piston, an extension rod, and a rod joint in accordance with the first embodiment of the present disclosure.
Figure 3:
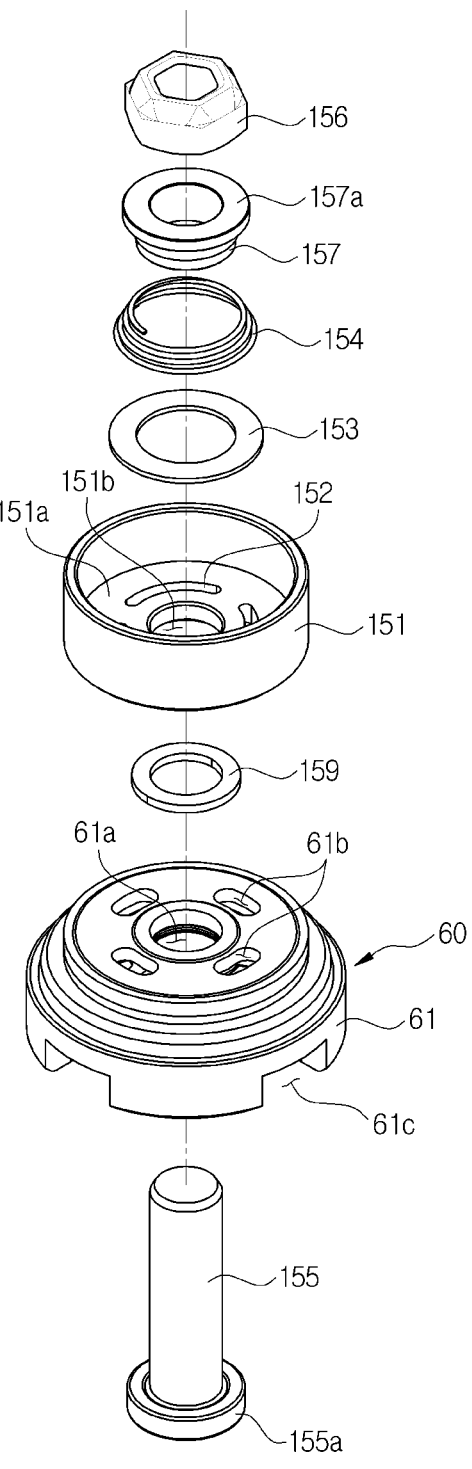
FIG. 3 is an exploded perspective view showing a tube joint and a body valve in accordance with the first embodiment of the present disclosure.

FIG. 1 is a cutaway perspective view showing a shock absorber 1 in accordance with a first embodiment of the present disclosure, and FIGS. 2 and 3 are exploded perspective views of different parts constituting the shock absorber 1 in accordance with the first embodiment of the present disclosure.

Referring to FIGS. 1 to 3, the shock absorber 1 in accordance with the first embodiment of the present disclosure includes an inner tube 10 having a cylinder filled with a working fluid therein, a piston rod 20 extending in a vertical direction and connected to a vehicle body, a piston valve 30 coupled to an end of the piston rod 20 to partition the cylinder into a rebound chamber 11 and a compression chamber 12, an outer tube 40 disposed to be spaced apart from the outer side of the inner tube 10, a reservoir chamber 50 formed between the inner tube 10 and the outer tube 40, a damping tube 100 provided in the compression chamber 12 and formed in a hollow shape to have a damping chamber 101 therein, a damping piston 120 pressurizing the working fluid accommodated in the damping chamber 101, an extension rod 130 connecting the damping piston 120 and the piston rod 20, a damping hole 110 formed through the damping tube 100 to allow the damping chamber 101 and the compression chamber 12 to communicate with each other, a rod joint 140 connecting the piston rod 20 to the extension rod 130, a body valve 60 provided on a lower side of the inner tube 10, and a tube joint 150 coupling the damping tube 100 and the body valve 60.

Meanwhile, an upper side (upper surface) and lower side (lower surface) described in the present embodiment refer to an upper part and lower part, respectively, based on FIG. 1, and it should be understood as a relative concept according to a disposition direction, rather than limiting a specific direction or a specific part.

The inner tube 10 may be provided in a cylindrical shape having a cylinder filled with a working fluid therein. The cylinder of the inner tube 10 may be partitioned into an upper rebound chamber 11 and a lower compression chamber 12 by the piston valve 30 to be described below. The outer tube 40 may be disposed to be spaced apart from an outer surface of the inner tube 10 by a predetermined interval, and may be provided in a shape of a cylinder filled with a working fluid therein like the inner tube 10. Since a diameter of the outer tube 40 is provided to be larger than that of the inner tube 10, a space may be formed between the outer side of the inner tube 10 and the inner side of the outer tube 40, and the reservoir chamber 50 to be filled with and accommodate the working fluid may be formed in the space. The reservoir chamber 50 may communicate with the compression chamber 12 and the damping chamber 101 by the body valve 60 to be described below.

A lower end of the piston rod 20 is positioned inside the cylinder, and an upper end thereof extends to the outside of the inner tube 10 and is connected to the vehicle body or wheel side. The piston valve 30 and the extension rod 130 to be described below are connected to a lower portion of the piston rod 20. The extension rod 130 allows the piston rod 20 and the damping piston 120 to be described below to operate together, and a detailed description thereof will be described below.

The piston valve 30 is coupled to the lower portion of the piston rod 20 that passes through the piston valve 30. The piston valve 30 may reciprocate along the cylinder together with the piston rod 20, and at least one compression passage 31 and at least one rebound passage 32 may be formed through the piston valve 30 in the vertical direction so that the working fluid may be moved during a compression stroke and a rebound stroke. Specifically, in the piston valve 30, during the compression stroke, the working fluid accommodated in the compression chamber 12 may be transferred to the rebound chamber 11 through the compression passage 31, and conversely, during the rebound stroke, the working fluid accommodated in the rebound chamber 11 may be transferred to the compression chamber 12 through the rebound passage 32. To this end, in the compression passage 31, an opening and closing member 33 that allows the working fluid to flow from the compression chamber 12 to the rebound chamber 11 when a difference between the hydraulic pressure of the compression chamber 12 and the hydraulic pressure of the rebound chamber 11 is greater than a preset level may be provided, and similarly, in the rebound passage, an opening and closing member 34 that allows the working fluid to flow from the rebound chamber 11 to the compression chamber 12 when the difference between the hydraulic pressure of the compression chamber 12 and the hydraulic pressure of the rebound chamber 11 is greater than a preset level may be provided. Each of the opening and closing members 33 and 34 may include a plurality of discs and fastening members for fastening the discs to the valve body of the piston valve 30. As described above, by flowing of the working fluid between the compression chamber 12 and the rebound chamber 11 during the compression stroke and the rebound stroke of the piston valve 30, a damping force may be generated by a flow resistance force of the working fluid.

The body valve 60 may be coupled to a lower end of the inner tube 10 to control the flow of the working fluid between the compression chamber 12 and the reservoir chamber 50. A through-hole 61*a* into which a body pin 155 to be described below is inserted and through which the body pin 155 passes may be provided at the center of the valve body 61 of the body valve 60, and at least one passage 61*b* formed through the valve body 61 in the vertical direction may be provided around the through-hole 61*a* so that the working fluid may move therethrough. In addition, discharge holes 61*c* openly formed along an outer circumferential surface of a lower side of the valve body 61 of the body valve 60 may be arranged to be spaced apart from each other, and opening and closing members (62 and 63 in FIG. 1) may be provided at upper and lower ends of the valve body 61, respectively, to control flow of the working fluid through the passages. Specifically, in the body valve 60, during the compression stroke, a portion of the working fluid accommodated in the compression chamber 12 may be transferred to the reservoir chamber 50 through the passages 61*b* and the discharge holes 61*c* of the body valve 60. At this time, a damping force may be generated by the flow resistance force of the working fluid. Conversely, the body valve 60 may transfer the working fluid accommodated in the reservoir chamber 50 to the compression chamber 12 through the passages 61*b* of the body valve 60 during the rebound stroke. To this end, the opening and closing members 62 and 63 provided at the upper and lower ends of the body valve 60, respectively, may include a plurality of discs that allow the working fluid to flow from the compression chamber 12 to the reservoir chamber 50 when the difference between the hydraulic pressure of the compression chamber 12 and the hydraulic pressure of the reservoir chamber 50 is greater than a preset level, and fastening members for fastening corresponding discs to the valve body. A plurality of discs that allow the working fluid to flow from the reservoir chamber 50 to the compression chamber 12 when the difference between the hydraulic pressure of the reservoir chamber 50 and the hydraulic pressure of the compression chamber 12 is greater than a preset level, and fastening members (not shown) for fastening the corresponding discs to the valve body may be included.

The damping tube 100 is provided in the compression chamber 12 and may be provided with the damping chamber 101 inside. Specifically, the damping tube 100 may be formed in a hollow shape with an empty interior to have a damping chamber 101 provided therein, and may be formed to extend along the vertical direction, which is a reciprocating direction of the piston rod 20 or the piston valve 30. An outer diameter of the damping tube 100 is provided to be smaller than an inner diameter of the inner tube 10, and thus a certain interval is provided between the outer circumferential side of the damping tube 100 and the inner circumferential side of the inner tube 10, where a connection chamber 12*a* is formed. The connection chamber 12*a* upwardly communicates with the compression chamber 12 and also communicates with the damping hole 110 of the damping tube 100 to be described below. In this way, the working fluid accommodated in the damping chamber 101 may be sequentially transferred to the compression chamber 12 through the damping hole 110 and the connection chamber 12*a*. An upper end of the damping tube 100 is open so that the damping chamber 101 and the compression chamber 12 communicate with each other, a lower end of the damping tube 100 may be connected to the tube joint 150 to be described below, and a flange 100*a* extending outwardly may be provided on an outer circumferential surface of the lower end of the damping tube 100. In addition, in a side of the damping tube 100, a plurality of damping holes 110 formed through the damping tube 100 are provided in a radial direction or in the vertical direction.

The plurality of damping holes 110 may be arranged along the vertical direction, which is a longitudinal direction of the damping tube 100, and a part of the working fluid pressurized in the damping chamber 101 by the damping piston 120 to be described below may pass through the damping holes 110. The plurality of damping holes 110 may be arranged to be spaced apart from each other at equal intervals, and the flow resistance force generated while a part of the working fluid pressurized in the damping chamber 101 is transferred to the connection chamber 12*a* through the damping holes 110 may generate an additional damping force.

The plurality of damping holes 110 arranged in the vertical direction may be provided with a diameter or size gradually decreasing from an upper side toward a lower side, that is, toward a pressurization direction of the damping piston 120. As the diameter or size of the damping hole 110 decreases, the fluid resistance force by the working fluid passing through the damping hole 110 increases, and thus the damping force also increases. Therefore, as the damping piston 120 descends with respect to FIG. 1, the fluid resistance force generated while the working fluid passes through the damping holes 110 gradually increases, and the damping force also gradually increases. As described above, by setting the damping force to gradually increase as the compression stroke lengthens, it is possible to prevent bottoming-out, which is an impact generated at a maximum compression stroke. Meanwhile, in the present embodiment, it has been described that the diameters or sizes of the damping holes 110 are set to gradually decrease from the upper side toward the lower side so that the fluid resistance force and the damping force gradually increase as the compression stroke lengthens, but in addition, the diameters or sizes of the damping holes 110 may be variously changed when the damping force characteristics are to be adjusted depending on the usage or traveling environment of the vehicle. In addition, the diameter or size of the damping hole 110 providing the optimum damping force characteristics according to a weight or performance of the vehicle may be set differently according to a vehicle type. A detailed description of the damping force generated by the damping hole 110 will be described below.

Inside the damping tube 100, the damping piston 120 is provided to slidably move along the vertical direction. The damping piston 120 may be connected and coupled to the piston rod 20 by the extension rod 130, through which the piston rod 20, the piston valve 30, the extension rod 130, and the damping piston 120 may reciprocate in the vertical direction together. The damping piston 120 may pressurize the working fluid accommodated in the damping chamber 101 by sliding down along the inside of the damping tube 100 during the compression stroke, and may slide up along the inside of the damping tube 100 during the rebound stroke.

The damping piston 120 may include a piston member 121 having an outer circumferential surface in close contact with an inner circumferential surface of the damping tube 100, a plurality of connection passages 122 formed through the piston member 121 in the vertical direction, at least one disk member 123 provided on an upper end of the piston member 121 to open and close the connection passages 122, a retainer 124 supporting the disk member 123 to the piston member 121, a disk washer 125 adjusting the degree of opening of the connection passage 122 by the disk member 123, and a rod pin 126 binding the piston member 121 and the extension rod 130 to be described below.

In the piston member 121, a through-hole that is formed through the center of the piston member 121 in the vertical direction and into which the rod pin 126 is inserted may be provided, and at least one connection passage 122 formed through the piston member 121 in the vertical direction to allow the working fluid to move may be provided around the through-hole. In addition, the at least one disk member 123 for controlling the flow of the working fluid through the connection passage 122 may be provided on the upper surface of the piston member 121. Specifically, the disk member 123 may be provided to cover the connection passage 122 on the upper surface of the piston member 121, and may transfer a part of the working fluid accommodated in the damping chamber 101 toward the compression chamber 12 by opening the connection passage 122 when the difference between the hydraulic pressure of the damping chamber 101 and the hydraulic pressure of the compression chamber 12 is greater than a preset level in the compression stroke. On the other hand, the disk member 123 may close the connection passage 122 in a non-operating state or in the rebound stroke, thereby preventing the flow of the working fluid from the compression chamber 12 to the damping chamber 101. The disk member 123 may be supported and held on the upper surface of the piston member 121 by the retainer 124, and the degree of deformation of the disk member 123 is limited by the disk washer 125, and thus the durability of the disk member 123 may be promoted. The rod pin 126 may pass through the piston member 121, the disk member 123, the retainer 124, and the disk washer 125 to be fastened and bound to the lower end of the extension rod 130. The lower end of the rod pin 126 may be provided with a flange 126a extending outwardly in the radial direction to come into contact with the lower end of the piston member 121, and the upper end of the rod pin 126 is press-fitted or screw-coupled to the lower end of the extension rod 130 so that the damping piston 120 may reciprocate together with the extension rod 130. A description of an additional damping force according to the movement of the damping piston 120 will be described below with reference to FIGS. 5 to 7.

The extension rod 130 is provided to connect the damping piston 120 to the piston rod 20 or the piston valve 30. The extension rod 130 is formed extending in the vertical direction, and an upper end may be bound to the piston rod 20 or the piston valve 30 by the rod joint 140 to be described below, and a lower end thereof may be bound to the rod pin 126 of the damping piston 120. To this end, a groove 142 formed to be recessed along a circumferential or a peripheral direction may be provided on an outer circumferential surface of the upper end of the extension rod 130 for connection with the rod joint 140 to be described below, and a fastener 131 into which the rod pin 126 is inserted may be provided at the lower end of the extension rod 130. In this way, when the piston rod 20 and the piston valve 30 reciprocate, a connecting rod and the damping piston 120 connected thereto also reciprocate together so that the additional damping force generated by the damping tube 100 and the damping piston 120 may be provided.

Meanwhile, while the vehicle is traveling, a large load is applied to the suspension system of the vehicle due to vibrations and impacts transmitted from the wheels and the vehicle body. At this time, in the case of a load in the vertical direction based on FIG. 1, the load may be absorbed and relieved through the movement of the piston rod 20 and the piston valve 30 of the shock absorber 1, but in an actual traveling environment, a load in the horizontal direction based on FIG. 1 is also applied due to various peripheral factors. In this case, when the shock absorber 1 is not able to receive the load in the horizontal direction, there is a risk of damage and deformation of the product.

Accordingly, the shock absorber 1 in accordance with the first embodiment of the present disclosure includes the rod joint 140 for freely adjusting the disposition angle of the extension rod 130 to absorb and relieve the load applied in the horizontal direction.

The rod joint 140 couples the piston rod 20 and the extension rod 130 to each other, where the connection is performed so that the disposition angle of the extension rod 130 with respect to the piston rod 20 is freely adjustable.

Figure 4:
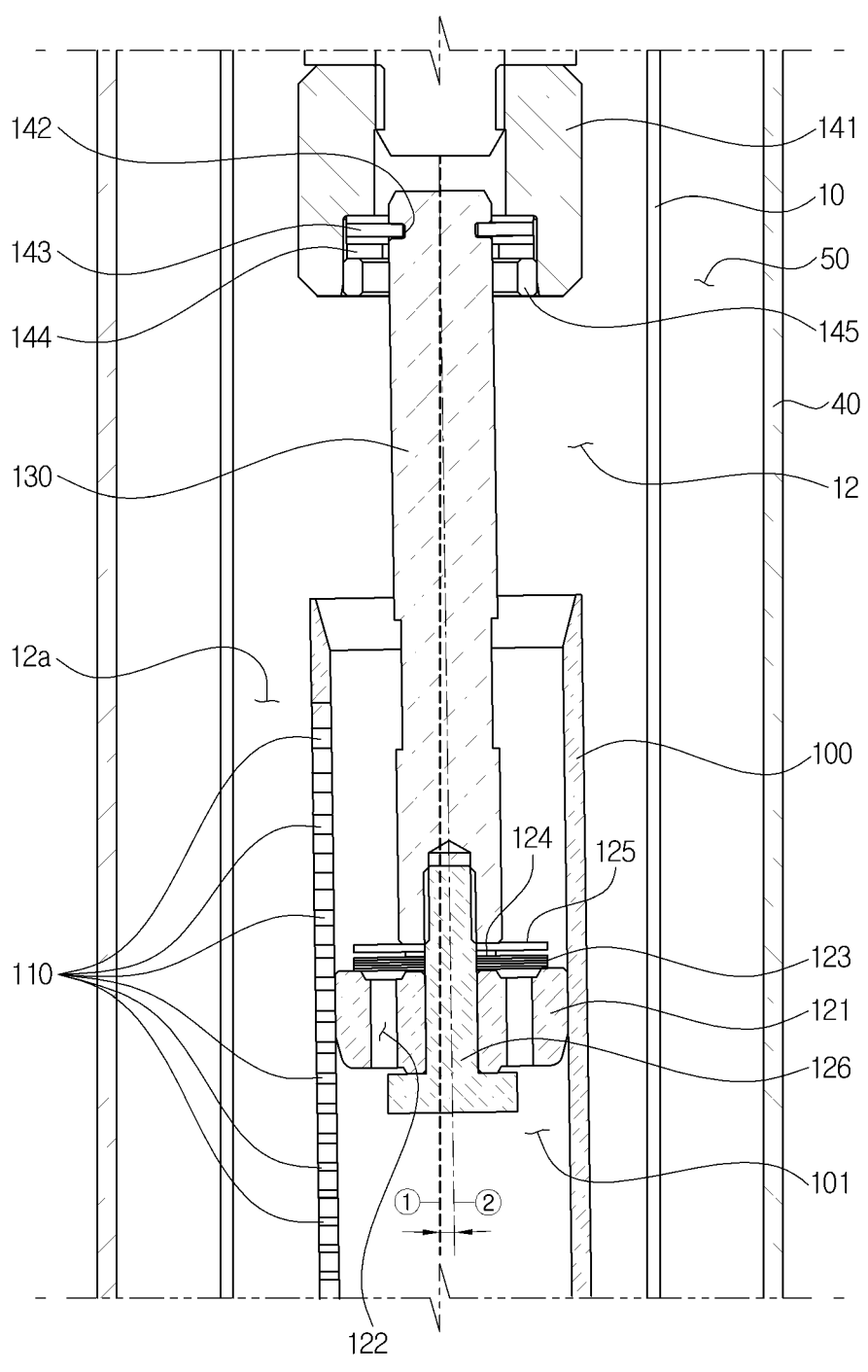
FIG. 4 is a lateral cross-sectional view showing the shock absorber in accordance with the first embodiment of the present disclosure and illustrates a state in which a disposition angle of the extension rod is adjusted by the rod joint.

FIG. 4 is a lateral cross-sectional view showing a state in which a disposition angle of the extension rod 130 is adjusted by the rod joint 140 in accordance with the first embodiment of the present disclosure, and referring to FIGS. 1 to 4, the rod joint 140 includes a rod nut 141 into which the lower end of the piston rod 20 and the upper end of the extension rod 130 are inserted in, the groove 142 formed to be recessed on the outer circumferential surface of an upper end of the extension rod 130, a guide member 143 having an outer circumferential surface in contact with an inner circumferential surface of a tube nut 156 and having an inner circumferential side portion inserted into the groove 142, a leaf spring 144 that elastically supports the guide member 143, a guide cap 145 for supporting the guide member 143 and the leaf spring 144 on the rod nut 141, and a rod washer 146 provided in contact with the guide member 143.

The rod nut 141 is formed to have a space passing through in the vertical direction, and on an upper side of the rod nut 141, a first hole 141a which at least a part of the lower end of the piston rod 20 is inserted into and fastened to may be formed, and on a lower side of the rod nut 141, a second hole 141b in which at least a part of the upper end of the extension rod 130 is accommodated may be formed. A male thread (or female thread) may be formed on an inner circumferential surface of the first hole 141a, and a female thread (or male thread) may be formed on the outer circumferential surface of the lower end of the piston rod 20, and thus the first hole 141a of the rod nut 141 may be screw-coupled and bound to the lower end of the piston rod 20. A part of the upper end of the extension rod 130 may be inserted into and accommodated in the second hole 141b, and the guide member 143, the leaf spring 144, the rod washer, and the guide cap 145, which will be described below, may be inserted into and supported in the second hole 141b.

The groove 142 may be formed to be recessed along the circumferential direction on the outer circumferential surface of the upper end of the extension rod 130. In addition, the guide member 143 may be formed in a disk shape, a through-hole 143b through which the extension rod 130 passes may be formed in the center of the guide member 143, an opening 143a formed to be open may be provided on one side, and the guide member 143 and the extension rod 130 may be coupled to each other through the opening 143a. An outer circumferential surface of the guide member 143 may face or contact an inner circumferential surface of the second hole 141*b*, and an inner circumferential side portion thereof may be inserted into the groove 142 so that the extension rod 130 may be held on the second hole 141*b*. On at least one of upper and lower surfaces of the guide member 143, the rod washer 146 that maintains a disposition position of the guide member 143 and limits a deformation level of the guide member 143 may be placed.

The leaf spring 144 is provided to elastically support the guide member 143. To this end, an upper end of the leaf spring 144 may elastically support the guide member 143 and a lower end thereof may be supported by the guide cap 145. The leaf spring 144 may be supported by the guide cap 145 coupled to a lower side in the second hole 141*b*, and the guide cap 145 may be installed to be coupled to an inlet side end of the second hole 141*b*, thereby suppressing the separation of the rod washer 146 and the guide member 143 inserted into the second hole 141*b*, in addition to the leaf spring 144. The leaf spring 144 may elastically support the guide member 143 coupled to the extension rod 130, whereby stable reciprocating movement of the extension rod 130 may be promoted even when an inclination occurs in the disposition angle ② of the extension rod 130 with respect to the disposition angle ① of the piston rod 20 due to a horizontal load on the shock absorber 1, and thus the additional damping force may be continuously provided. Meanwhile, in the drawings, the upper and lower surfaces of the leaf spring 144 are shown as being formed in a flat shape, but are not limited thereto, and may be provided in a shape of continuous pleats along the circumferential direction, or in a zigzag shape in which the height of one portion and the height of an adjacent portion are different, as long as the upper and lower surfaces are able to elastically support the guide member 143 and the extension rod 130.

The tube joint 150 is provided on a lower side of the damping tube 100 to couple the damping tube 100 and the body valve 60.

Referring to FIGS. 1 to 3, the tube joint 150 includes a housing 151 provided so that at least a part of the lower end of the damping tube 100 enters the therein, at least one passage hole 152 formed through the housing 151 to allow the damping chamber 101 and the compression chamber 12 to communicate with each other, a suction disk 153 for opening and closing the passage hole 152, a suction spring 154 for elastically supporting the suction disk 153, the body pin 155 disposed through the body valve 60, the housing 151, and the suction disk 153, the tube nut 156 coupled to the body pin 155, a suction guide 157 for supporting the suction spring 154, and a housing cap 158 interposed between the housing 151 and the damping tube 100.

The housing 151 may be formed in a hollow cylindrical shape with an empty interior, and may have an open top so that a part of the lower end of the damping tube 100 may enter the inside of the housing 151. The inner diameter of the housing 151 may be provided to be larger than the outer diameter of the damping tube 100, and accordingly, a mounting space into which the housing cap 158 is inserted may be formed between the inner circumferential surface of the housing 151 and the outer circumferential surface of the damping tube 100. A bottom surface of the damping tube 100 may be placed on the bottom surface 151*a* of the housing 151, and an outer circumferential surface of the flange 100*a* of the damping tube 100 may be provided to face the inner circumferential surface of the housing 151. In this state, the housing cap 158 may be inserted into the mounting space, and an insertion portion 158*a* of the housing cap 158 inserted into the mounting space may be press-fitted to the inner circumferential surface of the housing 151, so that the damping tube 100 and the housing 151 may be coupled and bound to each other. Alternatively, the insertion portion 158*a* of the housing cap 158 is inserted into the mounting space and contacts the flange 100*a* and the housing 151 and the insertion portion 158*a* are fastened to each other by a fastening member such as a bolt, so that the damping tube 100 and the housing 151 may be bound to each other.

The bottom surface 151*a* of the housing 151 may be provided with a through-hole 151*b* into which the body pin 155 to be described below is inserted and through which the body pin 155 passes, and around the through-hole 151*b*, at least one passage hole 152 formed through the bottom surface 151*a* in the vertical direction to allow the damping chamber 101 and the compression chamber 12 inside the damping tube 100 to communicate with each other may be provided. The suction disk 153 may be provided at the upper end of the bottom surface 151*a* of the housing 151, and the suction disk 153 may be elastically supported by the suction spring 154 so that the flow of the working fluid may be controlled through the passage hole 152. Specifically, when the hydraulic pressure of the damping chamber 101 drops rapidly during the rebound stroke and the difference with the hydraulic pressure of the compression chamber 12 becomes large, the suction disk 153 may open the passage hole 152 while compressing the suction spring 154, allowing the working fluid to flow from the compression chamber 12 to the damping chamber 101. Then, as the hydraulic pressure of the damping chamber 101 rises, the suction disk 153 may expand by an elastic restoring force of the suction spring 154 and close the passage hole 152, when the difference between the hydraulic pressure of the damping chamber 101 and the hydraulic pressure of the compression chamber 12 is lower than a preset level. Meanwhile, reference numeral 159 in FIG. 3 denotes a spacer interposed between a lower surface of the housing 151 and an upper surface of the valve body of the body valve 60 to form an interval between the housing 151 and the body valve 60.

The suction spring 154 may be provided in a form of a coil so that a lower end thereof may be in contact with the suction disk 153 and the upper end thereof may be supported by the suction guide 157. The suction guide 157 may be provided in a cylindrical shape so that the body pin 155 to be described below is inserted into and passes through the suction guide 157, and may include a flange 157*a* that extends outwardly in the radial direction and crosses and supports an upper end of the suction spring 154. Separation of the suction guide 157 may be prevented by the tube nut 156 fastened to the body pin 155. That is, the suction guide 157 may be interposed between the lower surface of the tube nut 156 and the upper surface of the housing 151, and the upper end of the suction spring 154 may be supported by the flange 157*a*.

The body pin 155 may be disposed through the valve body 61 of the body valve 60, the housing 151, the suction disk 153, and the suction guide 157, and an upper portion of the body pin 155 may be exposed to the damping chamber 101. In addition, a lower end of the body pin 155 may be provided with a flange 155*a* formed to extend outwardly in the radial direction to be supported in contact with the lower end of the valve body 61 of the body valve 60. A male thread (or female thread) may be formed on an outer circumferential surface of the upper end of the body pin 155, and may be screw-coupled to a female thread (or male thread) formed on the inner circumferential surface of the tube nut 156, thereby coupling the damping tube 100 and the body valve 60.

Hereinafter, an operation method of the shock absorber 1 in accordance with the second embodiment of the present disclosure will be described.

First, the compression stroke of the shock absorber 1 in accordance with the first embodiment of the present disclosure will be described.

Figure 5:
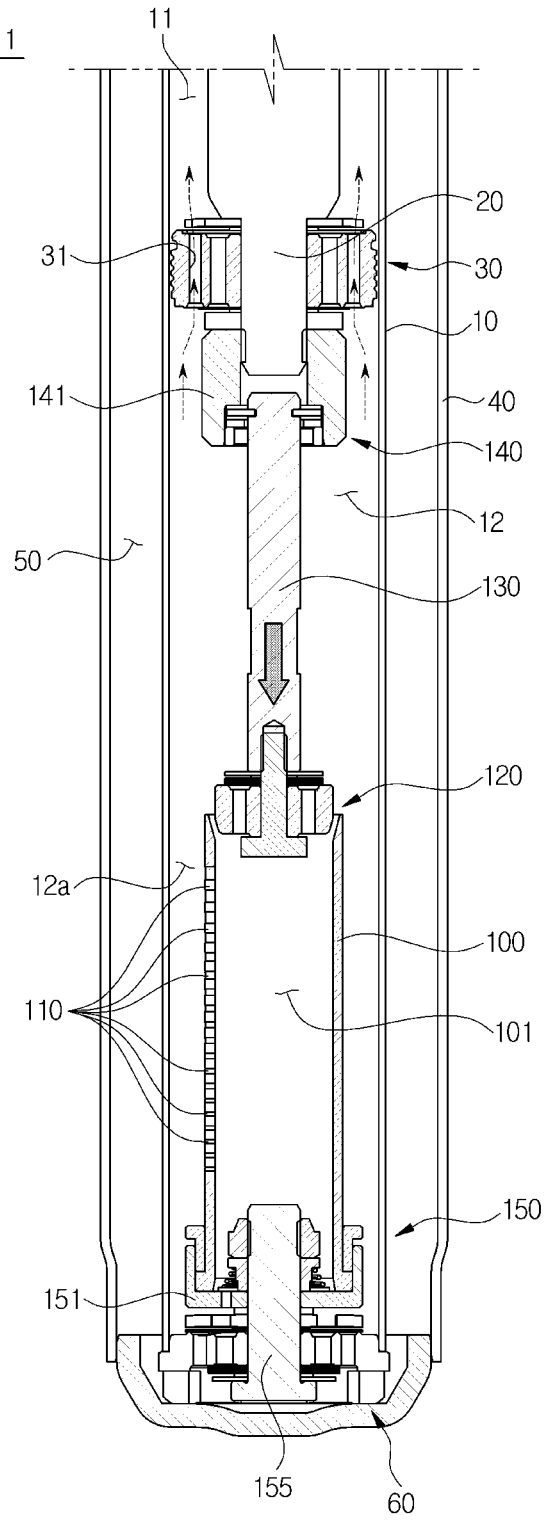
FIGS. 5 to 7 are lateral cross-sectional views showing the shock absorber in accordance with the first embodiment of the present disclosure and are operating state diagrams sequentially showing a compression stroke.
Figure 6:
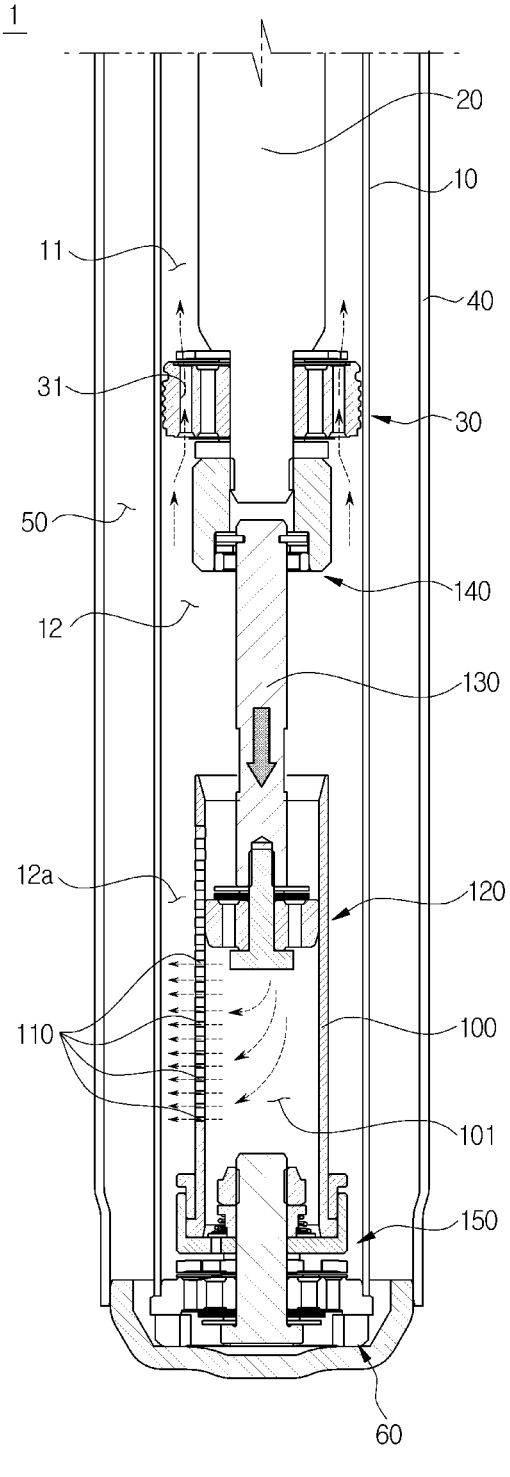
Figure 7:
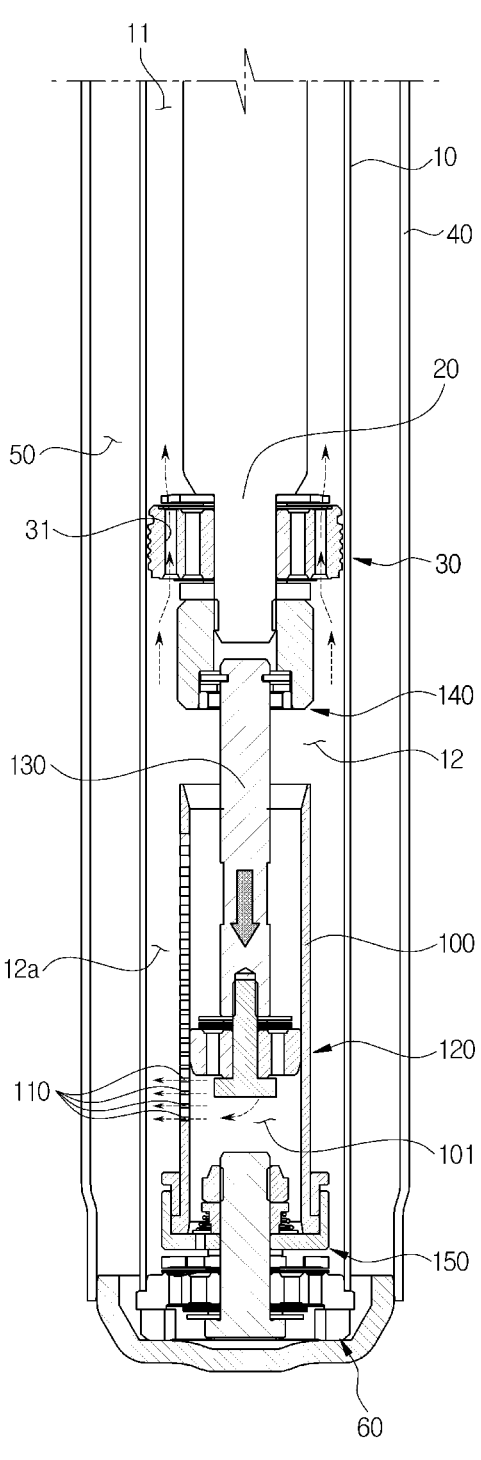

FIGS. 5 to 7 are cross-sectional or cutaway views showing the shock absorber 1 in accordance with the first embodiment of the present disclosure and are operating state diagrams sequentially showing the compression stroke.

When bumps or irregularities are present on the road surface while the vehicle is traveling, the compression stroke of the shock absorber 1 starts. Referring to FIG. 5, the piston rod 20 and the piston valve 30 descend based on FIG. 5 and pressurize the working fluid present in the compression chamber 12. The working fluid pressurized in the compression chamber 12 may be transferred to the rebound chamber 11 through the compression passage 31 of the piston valve 30, and in a process in which the working fluid is transferred through the compression passage 31 and the opening and closing member 33, a fluid resistance force may be generated and an initial damping force may be generated and provided by this fluid resistance force. Meanwhile, in a state in which the compression stroke starts, the hydraulic pressure of the damping chamber 101 by the damping piston 120 may not be generated.

Then, as the compression stroke continues, the piston rod 20 and the piston valve 30 descend further, and the piston valve 30 pressurizes the working fluid present in the compression chamber 12 and at the same time, the damping piston 120 connected to the extension rod 130 enters the inside of the damping tube 100 and pressurizes the working fluid accommodated in the damping chamber 101 together (see FIG. 6). As described above with reference to FIG. 5, the fluid resistance force is generated in the process in which the working fluid pressurized in the compression chamber 12 is transferred through the compression passage 31 of the piston valve 30, and an additional fluid resistance force may be generated by the damping piston 120 and the damping tube 100. Specifically, as the damping piston 120 descends, the hydraulic pressure of the working fluid accommodated in the damping chamber 101 gradually increases, and in a process in which the working fluid of the damping chamber 101 is transferred to the compression chamber 12 through the damping hole 110 of the damping tube 100, an additional fluid resistance force may be generated and thus an additional latter-half damping force may be provided to the vehicle body and occupants. In this case, even if a central axis of the piston rod 20 and a central axis of the damping tube 100 are out of coaxial state due to a load applied to the shock absorber 1 in the horizontal direction caused by irregularities of the road surface, since the rod joint 140 may allow an inclination of the disposition angle ② of the extension rod 130 with respect to the disposition angle ① of the piston rod 20, the compression stroke may smoothly proceed without interference between components.

As described above, a plurality of damping holes 110 formed in the damping tube 100 are arranged along the vertical direction, and are provided so that the diameter or size thereof gradually decreases from the upper side toward the lower side, that is, toward the pressurization direction of the working fluid. Accordingly, as the compression stroke continues and the damping piston 120 descends, the fluid resistance force of the working fluid transferred from the damping chamber 101 to the compression chamber 12 through the damping hole 110 increases, and thus, as the compression stroke becomes longer, the magnitude of the additionally provided damping force gradually increases (see FIG. 7). In this way, it is possible to prevent a bottoming-out phenomenon in which shock is applied during the maximum compression stroke.

Meanwhile, although not shown in FIGS. 6 and 7, when the hydraulic pressure of the damping chamber 101 rapidly increases due to a rapid compression stroke, the difference between the hydraulic pressure of the damping chamber 101 and the hydraulic pressure of the compression chamber 12 may be greater than a preset level. In this case, the disk member 123 provided in the damping piston 120 may open the connection passage 122, thereby directly transferring a part of the working fluid accommodated in the damping chamber 101 toward the compression chamber 12, and thus, the durability of the shock absorber 1 may be promoted and operational reliability may be improved even in various operating environments of the shock absorber 1.

Next, the rebound stroke of the shock absorber 1 in accordance with the first embodiment of the present disclosure will be described.

Figure 8:
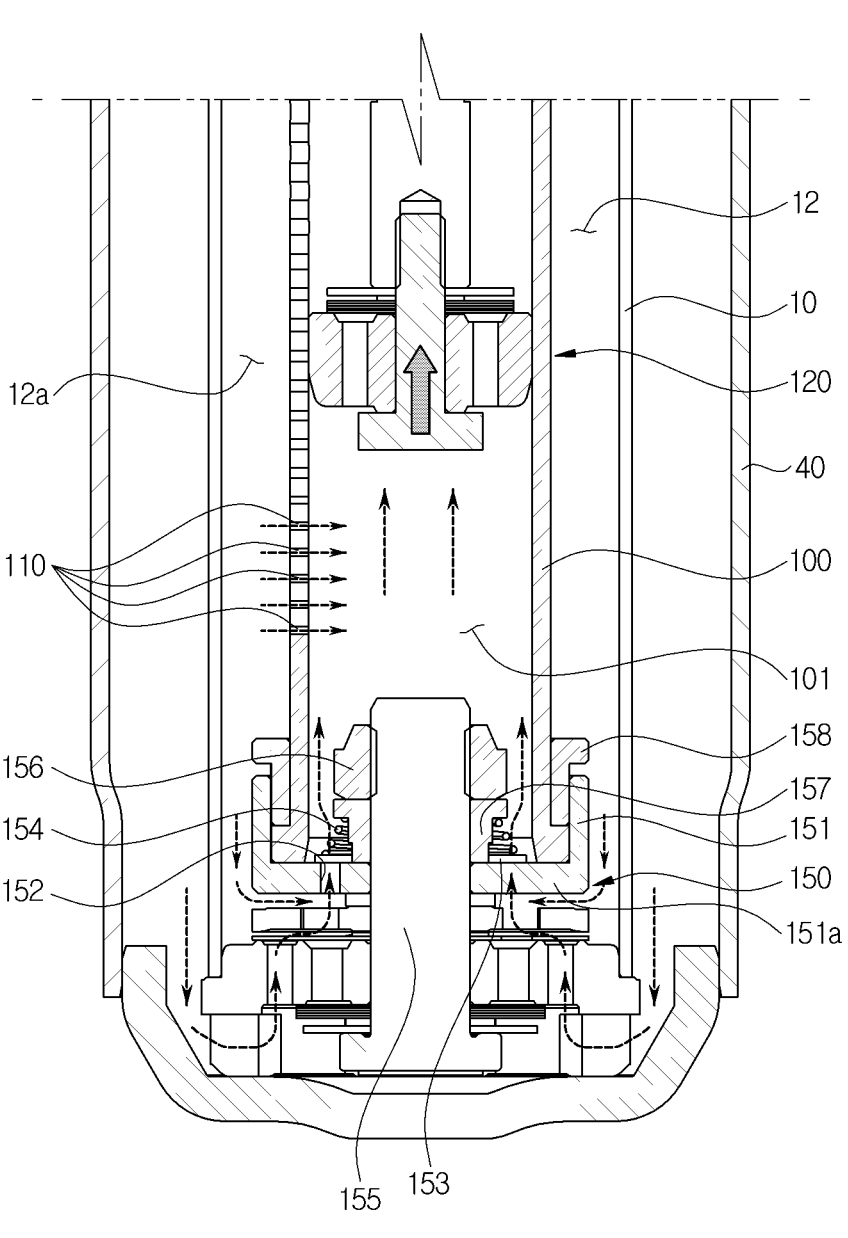
FIG. 8 is a lateral cross-sectional view showing the shock absorber in accordance with the first embodiment of the present disclosure and is an operating state diagram showing a rebound stroke.

FIG. 8 is a lateral cross-sectional view of the shock absorber 1 in accordance with the first embodiment of the present disclosure during the rebound stroke. Referring to FIG. 8, during the rebound stroke of the shock absorber 1, the piston rod 20 and the piston valve 30 rise based on FIG. 8, the damping piston 120 and the extension rod 130 connected to the piston rod 20 also rise together. As the piston valve 30 rises, the working fluid accommodated in the rebound chamber 11 may be transferred to the compression chamber 12 through the rebound passage 32 of the piston valve 30, and in a process in which the working fluid is transferred through the rebound passage 32 and the opening and closing member 34, a fluid resistance force may be generated and thus a damping force may be generated and provided. At the same time, as the damping piston 120 rises, a volume of the damping chamber 101 increases, and a part of the working fluid accommodated in the compression chamber 12 may flow into the damping chamber 101 through the damping hole 110. At this time, when the working fluid does not flow smoothly into the damping chamber 101, since the hydraulic pressure of the damping chamber 101 becomes lower than the hydraulic pressure of the compression chamber 12, the smooth rise of the damping piston 120 and the piston valve 30 may be hindered. In order to prevent this, when the difference between the hydraulic pressure of the damping chamber 101 and the hydraulic pressure of the compression chamber 12 is lower than a preset level, the suction disk 153 may open the passage hole 152 of the housing 151 while compressing the suction spring 154. In this way, the flow of the working fluid transferred from the compression chamber 12 to the damping chamber 101 through the passage hole 152 may be allowed, and the working fluid may smoothly and quickly flow into the damping chamber 101.

Hereinafter, a shock absorber 2 in accordance with a second embodiment of the present disclosure will be described.

Figure 9:
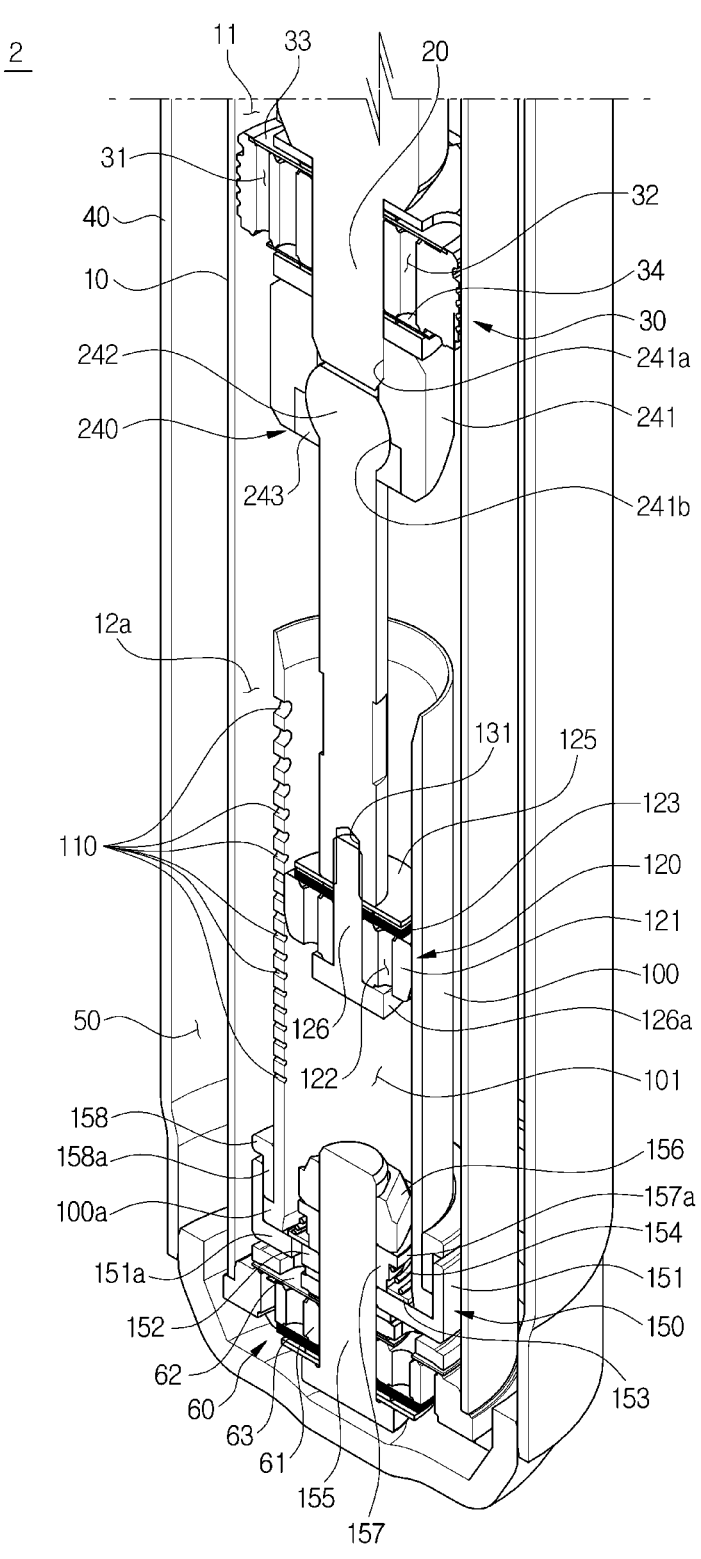
FIG. 9 is a cutaway perspective view showing a shock absorber in accordance with a second embodiment of the present disclosure.

FIG. 9 is a cutaway perspective view showing the shock absorber 2 in accordance with a second embodiment of the present disclosure.

Referring to FIG. 9, the shock absorber 2 in accordance with the second embodiment of the present disclosure includes an inner tube 10 having a cylinder filled with a working fluid therein, a piston rod 20 extending in a vertical direction and connected to a vehicle body, a piston valve 30 coupled to an end of the piston rod 20 to partition the cylinder into a rebound chamber 11 and a compression chamber 12, an outer tube 40 disposed to be spaced apart from the outer side of the inner tube 10, a reservoir chamber 50 formed between the inner tube 10 and the outer tube 40, a damping tube 100 provided in the compression chamber 12 and formed in a hollow shape to have a damping chamber 101 therein, a damping piston 120 pressurizing the working fluid accommodated in the damping chamber 101, an extension rod 130 connecting the damping piston 120 and the piston rod 20, a damping hole 110 formed through the damping tube 100 to allow the damping chamber 101 and the compression chamber 12 to communicate with each other, a rod joint 240 connecting the piston rod 20 to the extension rod 130, a body valve 60 provided on a lower side of the inner tube 10, and a tube joint 150 coupling the damping tube 100 and the body valve 60.

The description of the second embodiment of the present disclosure to be described below is the same as that of the shock absorber 1 in accordance with the first embodiment described above, except for parts to be denoted by separate reference numbers and additionally described, and thus descriptions of the same parts will be omitted to avoid duplication of content.

The rod joint 240 includes a rod nut 241 into which the lower end of the piston rod 20 and the upper end of the extension rod 130 are inserted, a ball member 242 formed at the upper end of the extension rod 130, and a guide cap 243 for supporting the ball member 242 on the rod nut 241.

The rod nut 241 is formed to have a through space provided in the vertical direction therein, and on an upper side of the rod nut 241, a first hole 241a which at least a part of the lower end of the piston rod 20 is inserted into and fastened to may be formed, and on a lower side of the rod nut 241, a second hole 241b in which the ball member 242 provided at the upper end of the extension rod 130 is accommodated may be formed. A male thread (or female thread) may be formed on an inner circumferential surface of the first hole 241a, and a female thread (or male thread) may be formed on the outer circumferential surface of the lower end of the piston rod 20, and thus the first hole 241a of the rod nut 241 may be screw-coupled and bound to the lower end of the piston rod 20. The ball member 242 provided at the upper end of the extension rod 130 may be inserted into and accommodated in the second hole 241b, and the ball member 242 is supported and is prevented from escaping, by the guide cap 243.

The ball member 242 provided at the upper end of the extension rod 130 may be provided in a spherical shape and may be inserted into and accommodated in the second hole 241b. The ball member 242 may be provided integrally with the extension rod 130, and at least a part of the second hole 241b may have a spherical shape corresponding to the shape of the ball member 242 so that the ball member 242 may freely rotate in the second hole 241b. A lower side of the ball member 242 may be supported by the guide cap 243 to suppress the escape of the ball member 242 from the second hole 241b.

As the ball member 242 is rotatably provided in the second hole 241b, stable reciprocating movement of the extension rod 130 may be promoted even when an inclination occurs in the disposition angle of the extension rod 130 with respect to the disposition angle of the piston rod 20 due to the horizontal load on the shock absorber 2, and thus the additional damping force may be continuously provided.

Since the shock absorbers 1 and 2 in accordance with the present embodiments may provide an additional damping force with a simple structure without a separate device operated by power supply, it is possible to improve both ride comfort and steering stability of the vehicle. In particular, since the additional damping force may be provided with a simple structure such as the damping tube 100 and the damping piston 120, the manufacturing costs of the product may be reduced and assembly quality and productivity may be increased. In addition, since the additional damping force may be stably generated and provided despite a load applied to the shock absorbers 1 and 2 in the horizontal direction, the performance and durability of a product may also be improved. In addition, since optimum damping forces for various types of vehicles may be set by changing the diameter or size of the damping hole 110 formed in the damping tube 100 depending on the operating environment, weight, performance, or the like of the vehicle, versatility of a product may be expanded.

The invention claimed is:

1. A shock absorber including an inner tube having a cylinder filled with a working fluid therein, a piston rod extending in a vertical direction and connected to a vehicle body, and a piston valve coupled to an end of the piston rod to partition the cylinder into a rebound chamber and a compression chamber, the shock absorber comprising:
   a damping tube provided in the compression chamber and formed in a hollow shape to have a damping chamber therein;
   a damping piston provided to slidably move along an inner side of the damping tube and configured to pressurize the working fluid accommodated in the damping chamber;
   an extension rod configured to connect the damping piston and the piston rod to each other;
   at least one damping hole formed through the damping tube to allow the damping chamber and the compression chamber to communicate with each other; and
   a rod joint configured to couple the piston rod and the extension rod, wherein the coupling is performed so that a disposition angle of the extension rod with respect to the piston rod is freely adjustable.

2. The shock absorber according to claim 1, further comprising:
   an outer tube disposed to be spaced apart from an outer side of the inner tube; and
   a reservoir chamber formed between the outer side of the inner tube and an inner side of the outer tube.

3. The shock absorber according to claim 2, further comprising a body valve coupled to a lower side of the inner tube and configured to control flow of the working fluid between the damping chamber and the reservoir chamber.

4. The shock absorber according to claim 3, further comprising a tube joint configured to couple the damping tube and the body valve.

5. The shock absorber according to claim 4, wherein the tube joint includes:
   a housing provided to have an open top to allow at least a part of a lower end of the damping tube to enter an inside of the housing;
   at least one passage hole formed through a bottom surface of the housing in the vertical direction to allow the damping chamber and the compression chamber to communicate with each other;
   a suction disk provided on an upper surface of the bottom surface to open and close the passage hole; and
   a suction spring configured to elastically support the suction disk.

6. The shock absorber according to claim 5, wherein the tube joint further includes a housing cap interposed between the housing and the damping tube, wherein an inner diameter of the housing is provided to be larger than an outer diameter of the damping tube so that a mounting space is formed between an inner circumferential surface of the housing and an outer circumferential surface of the damping tube, and the housing cap includes an insertion portion inserted into the mounting space and press-fitted to the inner circumferential surface of the housing.

7. The shock absorber according to claim 6, wherein a flange formed to extend outwardly to contact a lower end of the insertion portion is provided at the lower end of the damping tube.

8. The shock absorber according to claim 7, wherein an inner diameter of the housing is provided to be larger than an outer diameter of the damping tube so that a mounting space is formed between an inner circumferential surface of the housing and an outer circumferential surface of the damping tube, and the housing cap includes an insertion portion inserted into the mounting space to contact the flange, and a fastening member configured to bind the insertion portion and the housing.

9. The shock absorber according to claim 5, wherein the tube joint further includes:

a body pin having an upper portion exposed to the damping chamber through the body valve, the housing, and the suction disk;

a tube nut coupled to an upper end of the body pin; and a suction guide interposed between a lower surface of the tube nut and an upper surface of the housing and configured to support an upper end of the suction spring.

10. The shock absorber according to claim 1, wherein the damping tube extends in the vertical direction, and a plurality of damping holes are arranged in the damping tube in the vertical direction.

11. The shock absorber according to claim 10, wherein the plurality of damping holes are formed through the damping tube in a direction parallel to a radial direction of the damping tube, and are provided so that a diameter or size thereof gradually decreases from an upper side toward a lower side.

12. The shock absorber according to claim 1, wherein the rod joint includes:

a rod nut including a first hole into which at least a part of a lower end of the piston rod is inserted and a second hole into which at least a part of an upper end of the extension rod is accommodated;

a groove formed to be recessed along a circumferential direction on an outer circumferential surface of the upper end of the extension rod;

a guide member having an outer circumferential surface facing an inner circumferential surface of the second hole and an inner circumferential side portion inserted into the groove, and having an opening formed on one side; and a leaf spring configured to elastically support the guide member.

13. The shock absorber according to claim 12, wherein the rod joint further includes a guide cap coupled to a lower end of the second hole to support the guide member and the leaf spring, and the leaf spring has an upper end in contact with the guide member and a lower end supported by the guide cap.

14. The shock absorber according to claim 1, wherein the damping piston includes:

a piston member having an outer circumferential surface in close contact with an inner circumferential surface of the damping tube;

a connection passage formed through the piston member in the vertical direction;

at least one disk member provided on an upper end of the piston member to open and close the connection passage; and a retainer configured to support the disk member on the piston member.

15. The shock absorber according to claim 14, wherein the damping piston further includes a disk washer provided on an upper surface of the disk member to limit a degree of opening of the connection passage by the disk member, and a rod pin passing through the piston member and inserted into and coupled to a lower end of the extension rod to bind the piston member and the extension rod.

16. The shock absorber according to claim 1, wherein the rod joint includes:

a rod nut including a first hole into which at least a part of a lower end of the piston rod is inserted and a second hole into which at least a part of an upper end of the extension rod is accommodated; and a ball member formed at the upper end of the extension rod and provided to be inserted into the second hole to be freely rotatable.

17. The shock absorber according to claim 16, wherein the rod joint further includes a guide cap coupled to a lower end of the second hole to prevent separation of the ball member.

18. A shock absorber including an inner tube having a cylinder filled with a working fluid therein, a piston rod extending in a vertical direction and connected to a vehicle body, and a piston valve coupled to an end of the piston rod to partition the cylinder into a rebound chamber and a compression chamber, the shock absorber comprising:

a damping tube provided in the compression chamber and formed in a hollow shape to have a damping chamber therein;

a damping piston configured to generate an additional damping force by pressurizing the working fluid accommodated in the damping chamber;

an extension rod configured to bind the damping piston and the piston rod and provided so that a disposition angle of the extension rod with respect to the piston rod is freely adjustable;

at least one damping hole formed through the damping tube to allow the damping chamber and the compression chamber to communicate with each other; and a rod joint configured to couple the piston rod and the extension rod, wherein the coupling allows the disposition angle of the extension rod with respect to the piston rod to be freely adjustable.

19. The shock absorber according to claim 18, wherein a plurality of damping holes are arranged in the damping tube in the vertical direction, and the plurality of damping holes are provided so that a diameter or size thereof gradually decreases toward a pressurizing direction of the damping piston.

* * * * *